United States Patent
Rudolfi et al.

(10) Patent No.: US 10,471,812 B2
(45) Date of Patent: Nov. 12, 2019

(54) TOP OF A CONVERTIBLE VEHICLE, COMPRISING A POSITION DETECTOR

(71) Applicant: Webasto SE, Stockdorf (DE)

(72) Inventors: Christian Rudolfi, Stockdorf (DE); Franz Haberl, Stockdorf (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 15/950,345

(22) Filed: Apr. 11, 2018

(65) Prior Publication Data

US 2018/0304730 A1 Oct. 25, 2018

(30) Foreign Application Priority Data

Apr. 20, 2017 (DE) .................. 10 2017 108 380

(51) Int. Cl.
| | |
|---|---|
| *B60J 7/12* | (2006.01) |
| *B60J 7/185* | (2006.01) |
| *B60J 7/19* | (2006.01) |
| B60J 7/16 | (2006.01) |
| B60J 7/14 | (2006.01) |
| G01D 5/14 | (2006.01) |

(52) U.S. Cl.
CPC ........... *B60J 7/1204* (2013.01); *B60J 7/1851* (2013.01); *B60J 7/194* (2013.01); *B60J 7/143* (2013.01); *B60J 7/1664* (2013.01); *G01D 5/145* (2013.01)

(58) Field of Classification Search
CPC ...... B60J 7/1204; B60J 7/1851; B60J 7/1853; B60J 7/194
USPC ............................................. 296/107.12, 121
See application file for complete search history.

(56) References Cited

U.S. PATENT DOCUMENTS

| | | | | |
|---|---|---|---|---|
| 7,093,884 | B2 * | 8/2006 | Eichhorst ............... | B60J 7/0573 |
| | | | | 296/105 |
| 2001/0005090 | A1 * | 6/2001 | Haberl .................. | B60J 7/1851 |
| | | | | 296/121 |
| 2001/0028177 | A1 * | 10/2001 | Okada ................... | B60J 7/0573 |
| | | | | 296/121 |
| 2002/0163202 | A1 | 11/2002 | Hansen et al. | |
| 2003/0141741 | A1 * | 7/2003 | Obendiek ............. | B60J 7/1851 |
| | | | | 296/121 |
| 2008/0277974 | A1 | 11/2008 | Righetti et al. | |

(Continued)

FOREIGN PATENT DOCUMENTS

| | | |
|---|---|---|
| DE | 10 2005 001 079 A1 | 7/2006 |
| DE | 10 2015 216 923 A1 | 3/2017 |
| EP | 1 256 475 A1 | 11/2002 |

*Primary Examiner* — Jason S Morrow
(74) *Attorney, Agent, or Firm* — Fitch, Even, Tabin & Flannery, LLP

(57) ABSTRACT

A convertible top, having a linkage for displacing the top, a roof tip fixed to a front vehicle cowl in a closed position, a top lock which displacable between a locked and released position and secures the roof tip to the front cowl when the top is in the closed position and has a locking support having a pivotable locking hook and a locking counterpart which can be engaged with the locking hook, and a position detector which detects a relative position between the roof tip and the front cowl. The position detector has a sensor unit having at least two Hall-effect sensor elements, one of which switches at a first distance between the sensor unit and a magnetic element and the other one of which switches at a second distance between the sensor unit and the magnetic element, the second distance being different from the first distance.

10 Claims, 6 Drawing Sheets

(56) References Cited

U.S. PATENT DOCUMENTS

| | | | |
|---|---|---|---|
| 2012/0086231 A1* | 4/2012 | Wilke | B60J 7/1851 |
| | | | 296/121 |
| 2012/0086232 A1* | 4/2012 | Wilke | B60J 7/1851 |
| | | | 296/121 |
| 2017/0267082 A1* | 9/2017 | Matsumoto | B60J 7/08 |
| 2018/0015813 A1* | 1/2018 | Rudolfi | B60J 7/1204 |

* cited by examiner

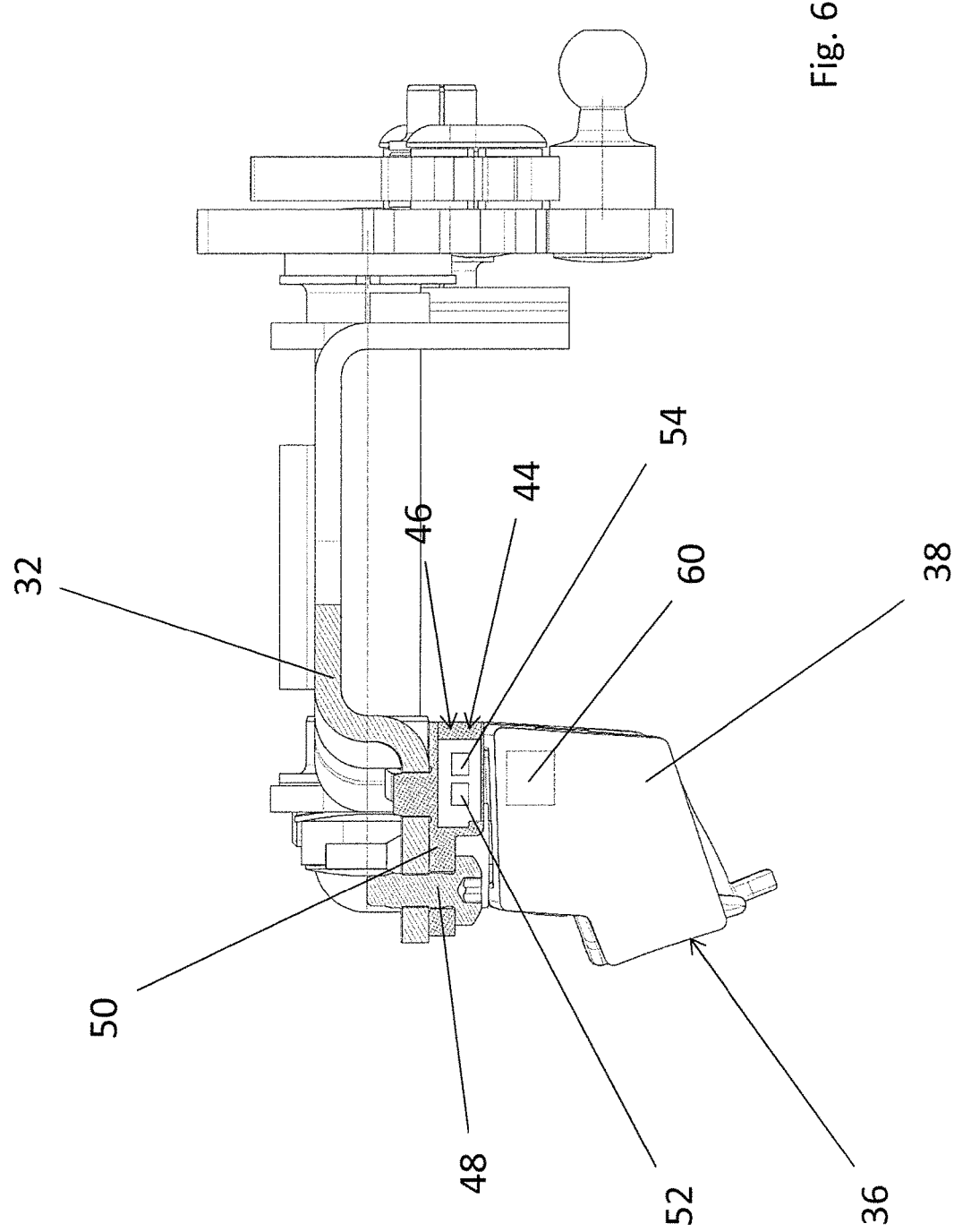

TOP OF A CONVERTIBLE VEHICLE, COMPRISING A POSITION DETECTOR

CROSS-REFERENCE TO RELATED APPLICATIONS

This application claims priority from German Patent Application Number DE 10 2017 108 380.4, filed Apr. 20, 2017, which is hereby incorporated herein by reference in its entirety for all purposes.

FIELD

The invention relates to a top of a convertible vehicle.

BACKGROUND

A top of this kind is known from practice and serves as a displaceable roof of a convertible vehicle. For displacing the top between a closed position, in which the interior of the vehicle is covered, and a storage position, in which the interior is uncovered, the top has a top linkage which is minor-symmetrical with respect to a vertical longitudinal center plane of the top and has a link arrangement on either side, each link arrangement being mounted on a respective vehicle-attached main bearing. In the closed position, the top is fixed to a front cowl of the vehicle via a roof tip, the front cowl being formed by an upper framer part of a frame of a windshield, said upper frame part extending in the transverse direction of the vehicle. In a folding top having a flexible and foldable top cover, the roof tip is formed by a front bow, which is covered by the top cover. In a retractable hard top (RHT), the roof tip is formed by a rigid front-side roof shell, which also forms a portion of the outer skin of the vehicle roof. For securing the roof tip to the front cowl, the top comprises a top lock which can be displaced between a locked position and a release position and which comprises a locking support having a pivotable locking hook and a locking counterpart which can be engaged with the locking hook. The locking support is disposed on the roof tip or formed by the roof tip, whereas the locking counterpart, which can be engaged with the locking hook, is formed on the front cowl. Moreover, it is known for a top of this kind to have a position detector comprising a sensor that detects a relative position between the roof tip and the front cowl.

The object of the invention is to provide, in a compact fashion, a position detector for a top of the kind described above that is capable of detecting multiple relative positions between the roof tip and the front cowl.

According to the invention, this object is attained by a top having a top linkage for displacing the top between a closed position, in which a vehicle interior is covered, and a storage position, in which the vehicle interior is uncovered, a roof tip which is fixed to a front cowl of the vehicle in the closed position, a top lock which can be displaced between a locked position and a release position and secures the roof tip to the front cowl when the top is in the closed position and has a locking support having a pivotable locking hook and a locking counterpart which can be engaged with the locking hook, and a position detector which detects a relative position between the roof tip and the front cowl, wherein the position detector comprises a sensor unit having at least two Hall-effect sensor elements, one of which switches at a first distance between the sensor unit and a magnetic element and the other one of which switches at a second distance between the sensor unit and the magnetic element, the second distance being different from the first distance.

According to the invention, the position detector thus comprises a sensor unit having at least two Hall-effect sensor elements, one of which switches at a first distance between the sensor unit and a magnetic element and the other one of which switches at a second distance between the sensor unit and the magnetic element, the second distance being different from the first distance.

In the top according to the invention, the position detector thus has only one magnetic element for detecting at least two distances between a front cowl and a roof tip. Said magnetic element interacts with the at least two Hall-effect sensor elements, which are disposed in the sensor unit, which is mobile relative to the magnetic element. The switching distances of the two sensor elements are associated with different distances between the sensor unit and the magnetic element. Thus, a position detector is realized that requires only little installation space in the area of the front cowl and of the roof tip. Since only one magnetic element is needed and no micro switch or the like has to be applied, the number of parts to be integrated into the top for the position detector is small as well. The small number of parts also allows the position detector to be low-cost.

Preferably, the sensor unit, which is programmed in such a manner that at least two switching distances are realized using the at least two Hall-effect sensor elements, is connected to a controller of the top lock. In this case, the switching signals triggered when the magnetic element interacts with the Hall-effect sensor elements can in particular be used to actuate the top lock.

SUMMARY

In a preferred embodiment of the top according to the invention, the first distance between the sensor unit and the magnetic element is associated with a ready-to-latch position between the roof tip and the front cowl. The ready-to-latch position is defined by the condition that the locking hook can be engaged with the locking counterpart when in this position, meaning that when this position has been reached starting from the storage position, the top lock can be actuated so as to displace it into its locked position and to thus pull the roof tip against the cowl and secure it thereto. The ready-to-latch position thus signals the top lock or rather the controller of the top lock that displacement from the release position into the locked position is possible and sensible. The first sensor element emits a corresponding signal in this position.

In a specific embodiment of the top according to the invention, the second distance is associated with the closed position of the top, in which the roof tip is secured to the front cowl. Thus, by means of a corresponding switching signal of the second sensor element, the top controller is given the signal that the roof tip is properly secured to the front cowl.

In an advantageous embodiment of the top according to the invention, the magnetic element is disposed on the locking counterpart and the sensor unit is disposed on the support of the locking unit, which is formed on the roof tip. Thus, the Hall-effect sensor elements are disposed on the roof side or on the top side. In this case, no on-board cables or lines have to be lead to the position detector or to its magnetic element.

In an alternative embodiment of the top according to the invention, the magnetic element is disposed on the support of the locking unit, which is formed on the roof tip, and the sensor unit is disposed on the locking counterpart, which can be connected to the front cowl.

For the sensor unit to be easily installed, it preferably has a housing in which the two Hall-effect sensor elements are disposed next to each other when viewed from the magnetic element. Advantageously, the housing has a front end which is located opposite the magnetic element at least when the first distance and the second distance between the sensor unit and the magnetic element are reached.

In an alternative embodiment, the two Hall-effect sensor elements are disposed one behind the other, i.e. one on top of the other, when viewed from the magnetic field.

The magnetic element can be formed by a permanent magnet or by a ferromagnetic component of the vehicle body. The ferromagnetic component may be part of the locking counterpart, for example, which interacts with the first sensor element and with the second sensor element when reaching the first distance and the second distance, respectively.

In general, the top according to the invention can be a folding top or a retractable hard top (RHT) comprising multiple rigid roof segments which are adjacent to each other when in the closed position and which form the outer skin of the roof. The folding top can also be a so-called panel-bow top, which comprises multiple panel bows which are disposed adjacent to each other one behind the other in the longitudinal direction of the vehicle and form an at least substantially closed contact surface for a top cover.

The top lock of the top according to the invention can be a center lock or a lock that has a locking unit on either side of the vertical longitudinal center plane of the top, each locking unit having a locking support and a locking hook which can be engaged with the respective locking counterpart disposed on the front cowl. In the latter case, a position detector configured according to the invention can be disposed on each of the two locking units.

Other advantages and advantageous configurations of the subject-matter of the invention are apparent from the description, the drawing and the claims.

An embodiment of a top according to the invention is illustrated in a schematically simplified manner in the drawing and is explained in more detail in the following description.

BRIEF DESCRIPTIONS OF THE DRAWINGS

FIG. 6 also shows a view corresponding to FIG. 4, but in a closed position of the top, in which the roof tip is secured to the front cowl.

DETAILED DESCRIPTION

Figure 1:
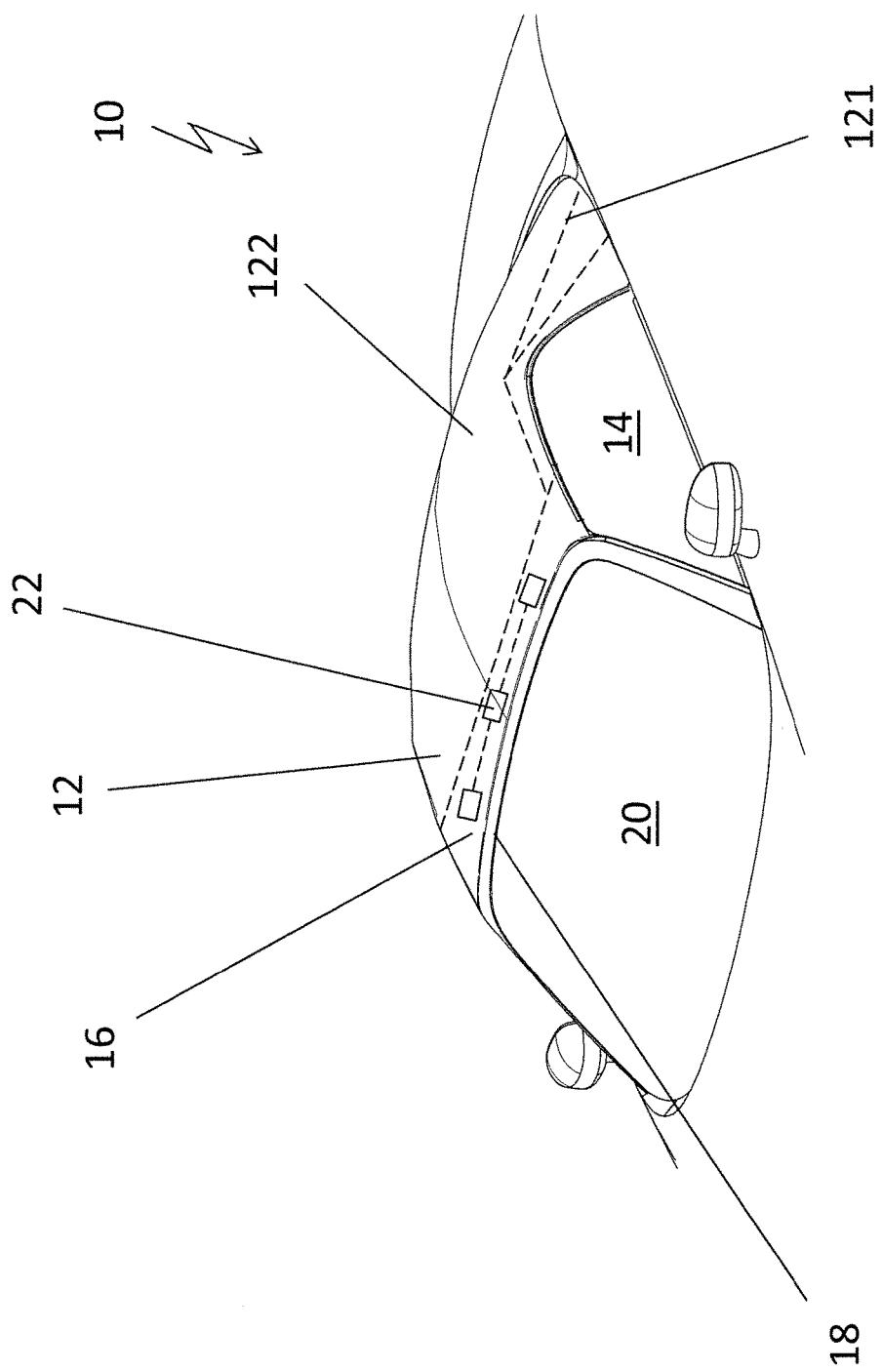
FIG. 1 shows a sectional perspective front view of a convertible vehicle having a top according to the invention.
Figure 2:
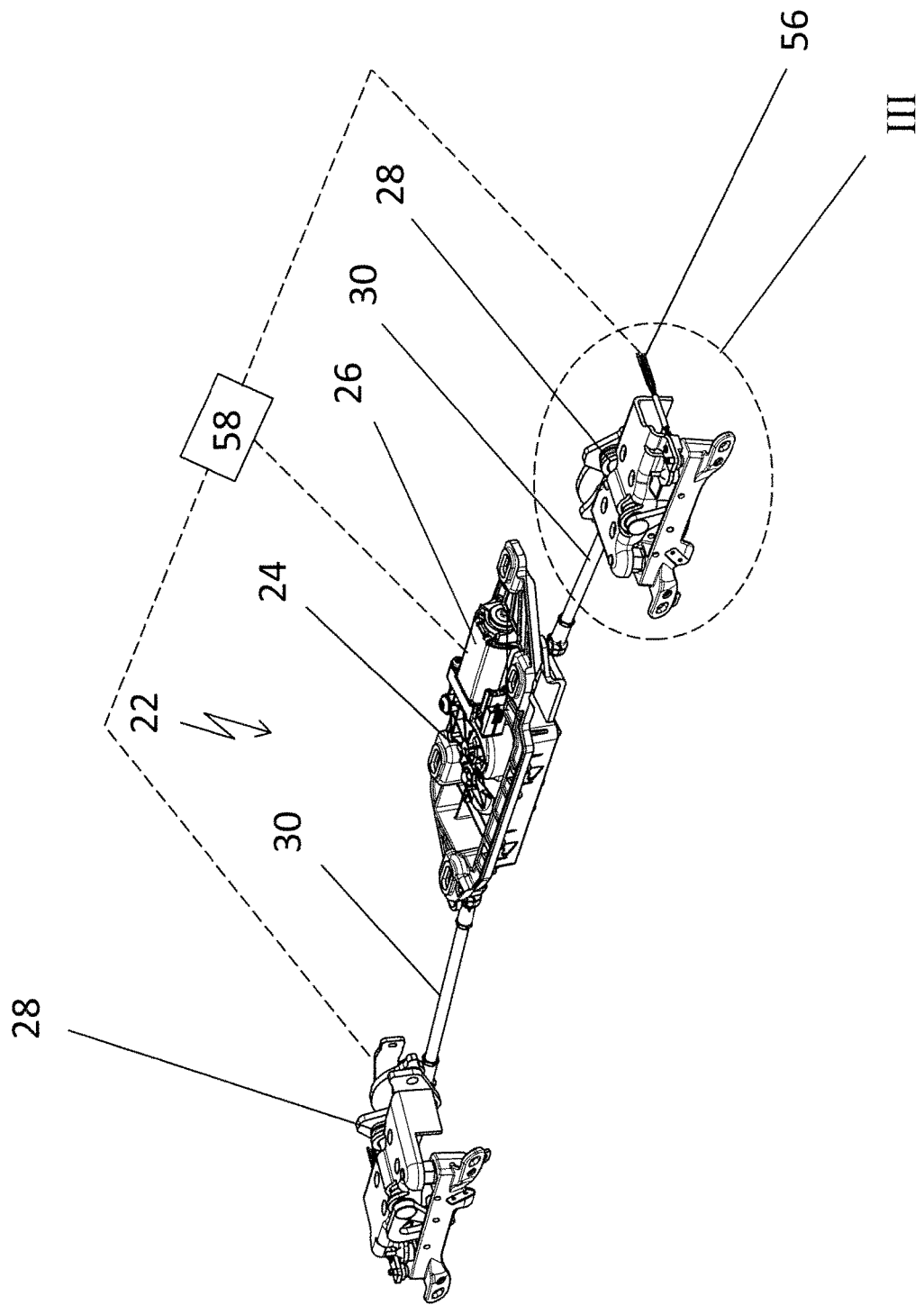
FIG. 2 shows a top lock of the top illustrated in FIG. 1.
Figure 3:
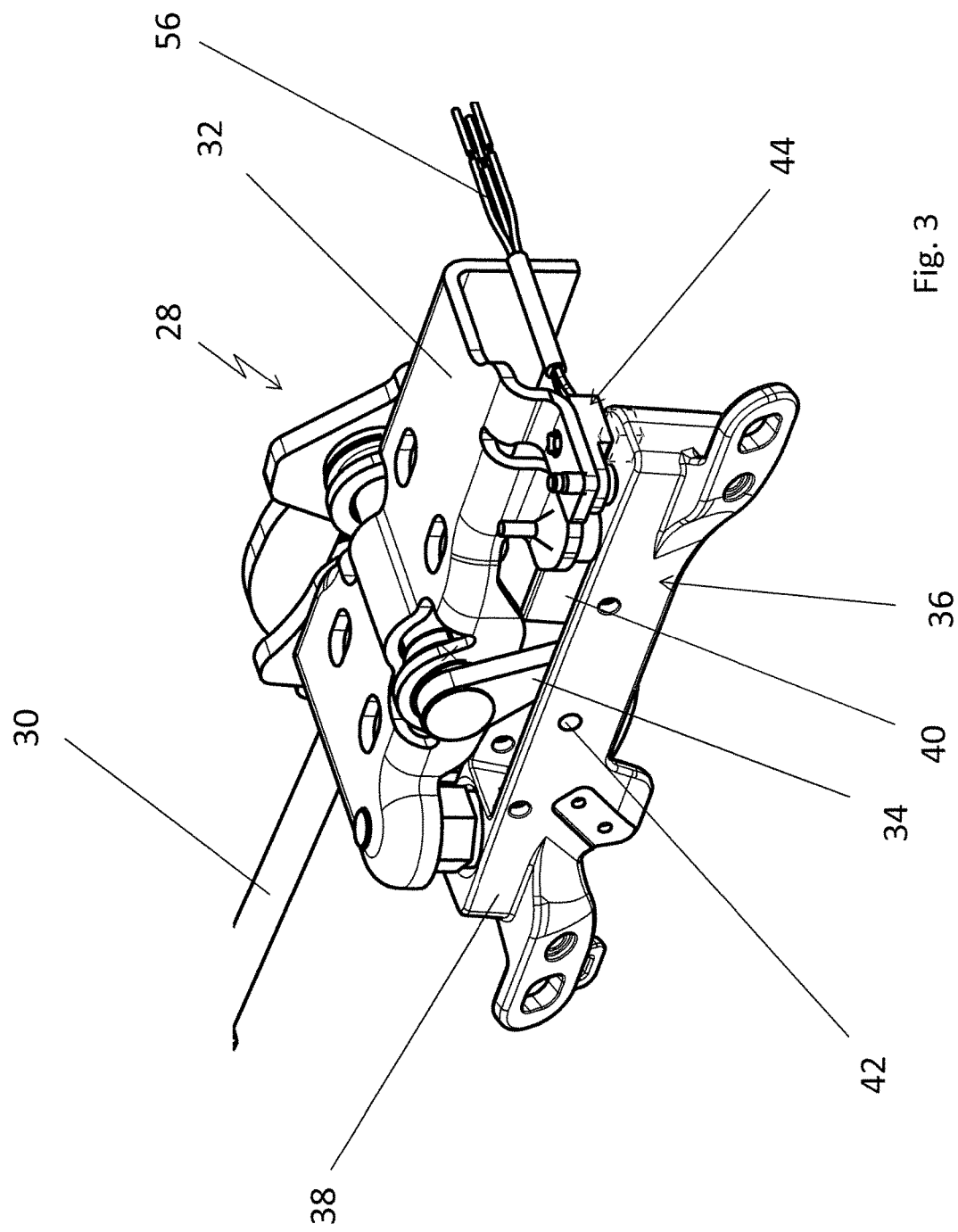
FIG. 3 shows an enlarged illustration of area III surrounded by a dashed line in FIG. 2.

FIG. 1 shows a convertible vehicle 10 which is provided with a displaceable top 12 which is a folding top having a flexible and foldable top cover 122 and which can be displaced between a closed position, which is illustrated in FIG. 1 and in which a vehicle interior 14 is covered, and a storage position (not illustrated), in which the vehicle interior is uncovered, by means of a top linkage 121. In the storage position, the top 12 is stored in a rear-side top storage space of the convertible vehicle 10. In the closed position, the top 12 is secured to a front cowl 18 via a front bow 16, which is a roof tip, the front cowl 18 forming an upper frame part of a frame of a windshield 20, said upper frame part extending in the transverse direction of the vehicle.

For securing the top 12, i.e. the front bow 16, to the front cowl 18, the top 12 has a top lock 22, which is illustrated in detail in FIGS. 2 to 6.

The top lock 22 comprises a driving unit 24 disposed centrally with respect to the transverse extension of the top and having a drive motor 26, which is an electric motor, and two locking units 28 which are disposed on either side of the vertical longitudinal center plane of the top and which are mirror-symmetrical to each other and each of which is connected to the driving unit 24 via a respective coupling rod 30.

Each locking unit 28 comprises a locking support 32 on which a locking hook 34 is pivotably mounted, which, for being driven, is connected with the respective coupling rod 30, which can be driven by the drive motor 26. The locking supports 32 are disposed on the underside of the front bow 16 and are covered by a headliner (not illustrated) toward the vehicle interior.

When the top 12 is in the closed position, the locking hooks 34 of the locking units 28 are each engaged with a locking counterpart 36 disposed on the front cowl and having a housing 38 in which a recess 40 is formed. The recess 40 is penetrated by a locking pin 42 which engages behind the locking hook 34 when the top 12 is in the closed position.

Furthermore, the top 12 has a position detector 44 on each of the two locking units 28, said position detector 44 serving to detect a relative position between the front bow 16 and the front cowl 18 in such a manner that a ready-to-latch position between the front bow 16 and the front cowl 18 (FIG. 5) can be detected on the one hand and a closed position of the top 12, i.e. a position of contact between the front bow 16 and the front cowl 18 (cf. FIG. 6), can be detected on the other hand.

The position detector 44 comprises a sensor unit 46 which is installed on the underside of the respective locking support 32 via a screw 48 and which has a housing 50 that accommodates two Hall-effect sensor elements 52 and 54, which are magnetic-field sensors, and is connected, via a signal line 56, to a controller 58 which also controls the drive motor 26 to actuate the top lock 22.

The two Hall-effect sensor elements 52 and 54 interact with a single magnetic element 60 which is disposed in the housing 38 of the locking counterpart 36 disposed on the cowl 18.

Figure 4:
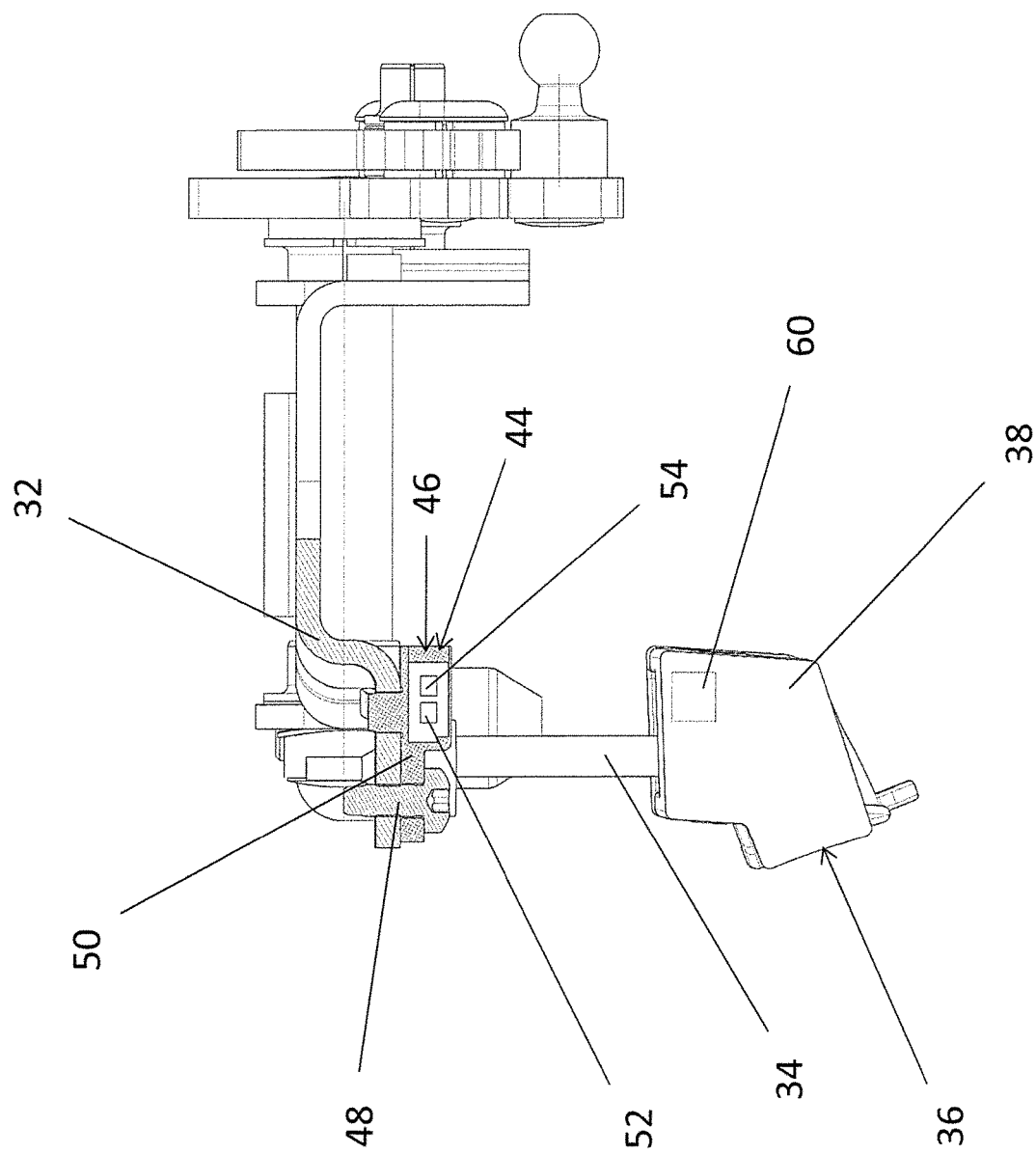
FIG. 4 shows a side view of the top lock while a roof tip is approaching a front cowl.
Figure 5:
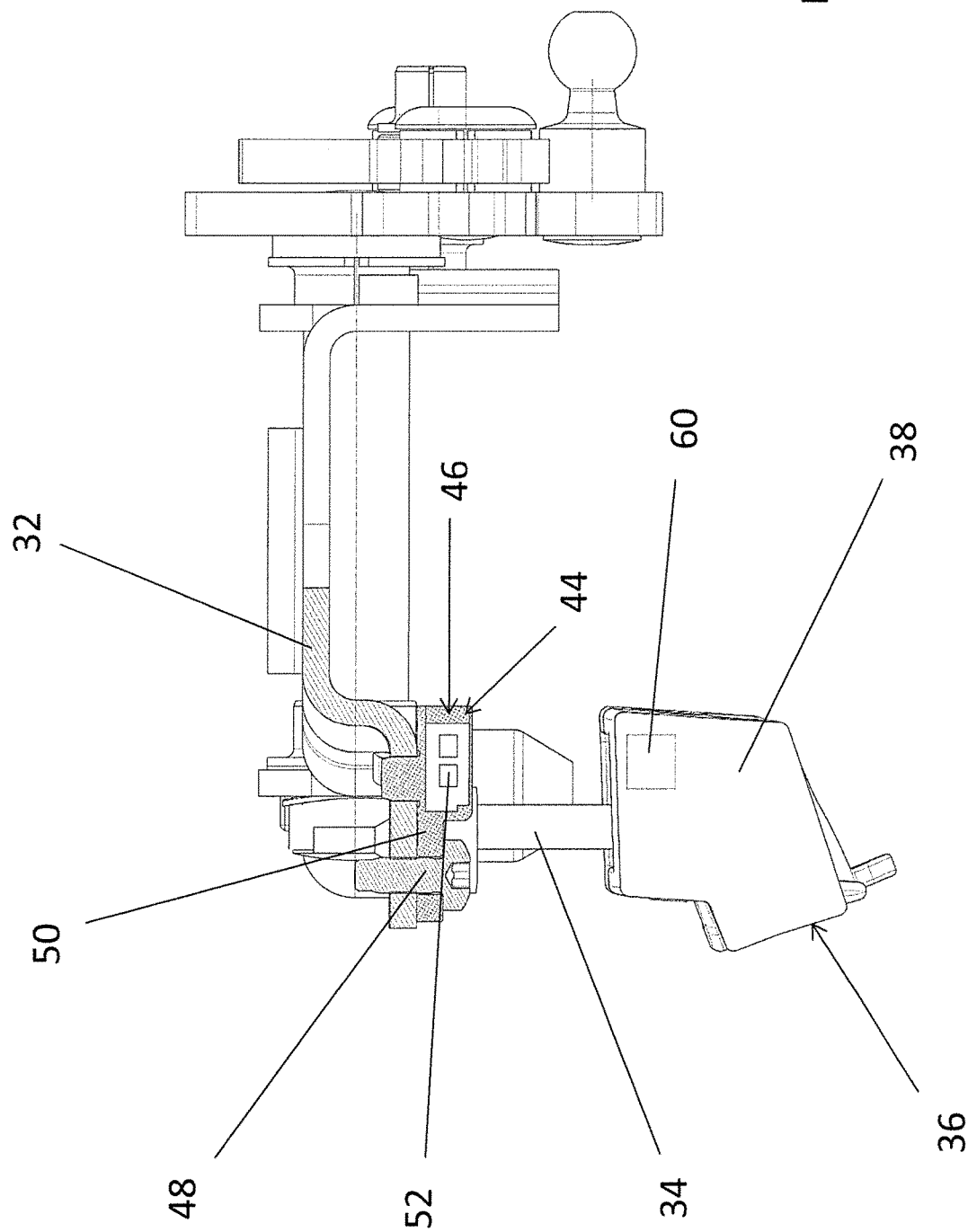
FIG. 5 shows a view corresponding to FIG. 4, but in a ready-to-latch position between the roof tip and the front cowl.

The first Hall-effect sensor element 52 is programmed for a magnetic-field strength in such a manner that when the top 12 is being displaced from the storage position into the closed position and a defined distance between the sensor unit 46 and the magnetic element 60 is reached, the first Hall-effect sensor element 52 switches, i.e. sends a control signal to the controller 58 which signals that the locking hook 34 can be engaged with the locking counterpart 60, i.e. with the locking pin 42 of the locking counterparts 36 (ready-to-latch position). When the ready-to-latch position is reached, the front bow 16 can be pulled against the cowl 18 by actuation of the top lock 22, and thus the top 12 can be secured to the front cowl 18. When the top 12 is being moved into the closed position starting from the storage position and, as illustrated in FIG. 4, the ready-to-latch position has not been reached yet, actuation of the top lock 22 is blocked because of the lack of a switching or release signal from the Hall-effect sensor element 52.

The second Hall-effect sensor element 54 is programmed for a magnetic-field strength in such a manner that when the closed position of the top 12 is reached, in which the front bow 16 is in contact with the front cowl 18 and the distance between the sensor unit 46 and the magnetic element 60 is minimal, the second Hall-effect sensor element 54 sends a corresponding switching signal to the controller 58. Switching of the Hall-effect sensor element 54 thus indicates to the controller 58 that the top 12 has arrived in its closed position.

REFERENCE SIGNS 10 convertible vehicle
12 top
14 vehicle interior
16 front bow
18 cowl
20 windshield
22 top lock
24 driving unit
26 drive motor
28 locking unit
30 coupling rod
32 locking support
34 locking hook
36 locking counterpart
38 housing
40 recess
42 locking pin
44 position detector
46 sensor unit
48 screw
50 housing
52 Hall-effect sensor element
54 Hall-effect sensor element
56 signal line
58 controller
60 magnetic element
121 top linkage
122 top cover

The invention claimed is:

1. A top of a convertible vehicle, comprising: a top linkage for displacing the top between a closed position, in which a vehicle interior is covered, and a storage position, in which the vehicle interior is uncovered, a roof tip which is fixed to a front cowl of the vehicle in the closed position, a top lock which can be displaced between a locked position and a release position and secures the roof tip to the front cowl when the top is in the closed position and has a locking support having a pivotable locking hook and a locking counterpart which can be engaged with the locking hook, and a position detector which detects a relative position between the roof tip and the front cowl, wherein the position detector comprises a sensor unit having at least two Hall-effect sensor elements, one of which switches at a first distance between the sensor unit and a magnetic element and the other one of which switches at a second distance between the sensor unit and the magnetic element, the second distance being different from the first distance.

2. The top according to claim 1, wherein the sensor unit is connected to a controller of the top lock.

3. The top according to claim 1, wherein the first distance is associated with a ready-to-latch position between the roof tip and the front cowl.

4. The top according to claim 1, wherein the second distance is associated with the closed position of the top in which the roof tip is secured to the front cowl.

5. The top according to claim 1, wherein the magnetic element is disposed on the locking counterpart and the sensor unit is disposed on the locking support, which is formed on the roof tip.

6. The top according to claim 1, wherein the magnetic element is disposed on the locking support, which is formed on the roof tip, and the sensor unit is disposed on the locking counterpart, which can be connected to the front cowl.

7. The top according to claim 1, wherein the sensor unit has a housing in which the two Hall-effect sensor elements are disposed next to each other or behind each other when viewed from the magnetic element, thus allowing the Hall-effect sensor elements to interact with the magnetic element via a same front end of the sensor unit.

8. The top according to claim 1, wherein the magnetic element is formed by a permanent magnet.

9. The top according to claim 1, wherein the magnetic element is formed by a ferromagnetic component of the top lock.

10. The top according to claim 1, wherein the roof tip is a front bow of a folding top or a rigid roof shell of a retractable hard top.

* * * * *